United States Patent
Böhm et al.

(10) Patent No.: US 11,204,107 B2
(45) Date of Patent: Dec. 21, 2021

(54) VACUUM VALVE SYSTEM FOR A REGULATED OPERATION OF A VACUUM PROCESS

(71) Applicant: VAT HOLDING AG, Haag (CH)

(72) Inventors: Christoph Böhm, Gams (DE); Daniel Seitz, Au (CH)

(73) Assignee: VAT HOLDING AG, Haag (CH)

( * ) Notice: Subject to any disclaimer, the term of this patent is extended or adjusted under 35 U.S.C. 154(b) by 187 days.

(21) Appl. No.: 16/339,271

(22) PCT Filed: Nov. 2, 2017

(86) PCT No.: PCT/EP2017/078051
§ 371 (c)(1),
(2) Date: Apr. 3, 2019

(87) PCT Pub. No.: WO2018/083176
PCT Pub. Date: May 11, 2018

(65) Prior Publication Data
US 2020/0063891 A1 Feb. 27, 2020

(30) Foreign Application Priority Data
Nov. 3, 2016 (EP) .................................... 16196985

(51) Int. Cl.
*F16K 31/02* (2006.01)
*F16K 37/00* (2006.01)
(Continued)

(52) U.S. Cl.
CPC .......... *F16K 37/0083* (2013.01); *F16K 51/02* (2013.01); *F16K 3/0218* (2013.01);
(Continued)

(58) Field of Classification Search
CPC .... F16K 37/0083; F16K 51/02; F16K 3/0218; F16K 3/18; F16K 3/20; F16K 31/535
(Continued)

(56) References Cited

U.S. PATENT DOCUMENTS 3,145,969 A 8/1964 Von Zweck
5,577,707 A 11/1996 Brida
(Continued)

FOREIGN PATENT DOCUMENTS

CA 2129470 A1 * 2/1995 ............. F16J 15/186
CN 105074305 11/2015
(Continued)

OTHER PUBLICATIONS

International Search Report and Written Opinion dated Feb. 13, 2018 in International Application No. PCT/EP2017/078051.

*Primary Examiner* — Minh Q Le
(74) *Attorney, Agent, or Firm* — Muncy, Geissler, Olds & Lowe, P.C.

(57) ABSTRACT

A valve system having a vacuum valve and a regulating unit is disclosed. The vacuum valve has a valve seat including a valve opening, a first seal surface, and a valve closure for closing the valve opening using a second seal surface. A drive unit coupled to the valve closure is designed to be adjusted to provide respective valve opening states. The regulating unit adjusts the valve opening state by actuating the drive unit based on a currently determined regulating variable and a target variable. The regulating unit has a checking function configured such that a series of states of the valve closure are detected as park of the regulating process, and the states are stored as current regulating data. The current regulating data is compared with specified target
(Continued)

regulating data and process information is generated based on the comparison of the current and the target regulating data.

14 Claims, 3 Drawing Sheets

(51) Int. Cl.
    *F16K 51/02*               (2006.01)
    *F16K 3/02*                (2006.01)
    *F16K 3/18*                (2006.01)
    *F16K 3/20*                (2006.01)
    *F16K 31/53*              (2006.01)

(52) U.S. Cl.
    CPC    *F16K 3/18* (2013.01); *F16K 3/20* (2013.01); *F16K 31/535* (2013.01)

(58) Field of Classification Search
    USPC .................................. 251/129.04; 137/487.5
    See application file for complete search history.

(56) References Cited

U.S. PATENT DOCUMENTS

| | | | |
|---|---|---|---|
| 6,022,483 A * | 2/2000 | Aral | B01J 3/006 |
| | | | 156/345.26 |
| 6,056,266 A | 5/2000 | Blecha | |
| 6,089,537 A | 7/2000 | Olmsted | |
| 6,416,037 B1 | 7/2002 | Geiser | |
| 6,629,682 B2 | 10/2003 | Duelli | |
| 6,776,394 B2 * | 8/2004 | Lucas | F16K 51/02 |
| | | | 251/203 |
| 8,833,388 B2 * | 9/2014 | Eto | H01L 21/67253 |
| | | | 137/487.5 |
| 2005/0067603 A1 | 3/2005 | Lucas et al. | |
| 2009/0084997 A1 * | 4/2009 | Lee | F16K 3/06 |
| | | | 251/129.01 |
| 2009/0301579 A1 | 12/2009 | Wong et al. | |
| 2010/0327203 A1 * | 12/2010 | Nagai | F16K 3/06 |
| | | | 251/193 |
| 2011/0295407 A1 * | 12/2011 | Pyotsia | F16K 37/0083 |
| | | | 700/110 |
| 2014/0130907 A1 * | 5/2014 | Watanabe | G05D 16/024 |
| | | | 137/487.5 |
| 2014/0290752 A1 * | 10/2014 | Matsuura | H01L 21/67017 |
| | | | 137/14 |
| 2015/0145413 A1 * | 5/2015 | Merry | F16K 51/00 |
| | | | 315/110 |
| 2015/0224620 A1 * | 8/2015 | Takahashi | B24B 37/30 |
| | | | 451/442 |
| 2016/0040789 A1 | 2/2016 | Bestebner | |
| 2016/0069468 A1 | 3/2016 | Schon et al. | |
| 2016/0169410 A1 | 6/2016 | Wheeler et al. | |
| 2016/0195191 A1 * | 7/2016 | Taguchi | F16K 51/02 |
| | | | 251/318 |
| 2017/0328756 A1 * | 11/2017 | Chamberlain | F16K 51/02 |
| 2018/0163876 A1 * | 6/2018 | Emmanuel | F16K 3/0218 |
| 2018/0202560 A1 * | 7/2018 | Kogame | F16K 27/045 |
| 2018/0259983 A1 * | 9/2018 | Madlener | G05D 16/202 |

FOREIGN PATENT DOCUMENTS

| | | |
|---|---|---|
| CN | 105339713 A | 2/2016 |
| CN | 105370979 | 7/2019 |
| DE | 1264191 B | 3/1968 |
| DE | 7731993 U1 | 1/1978 |
| DE | 3447008 C2 | 6/1986 |
| EP | 0637713 A1 | 2/1995 |
| JP | 2011039824 A | 2/2011 |
| JP | 2011134164 A | 7/2011 |
| WO | 2002048813 A2 | 6/2002 |
| WO | 2011135155 A1 | 11/2011 |

\* cited by examiner

VACUUM VALVE SYSTEM FOR A REGULATED OPERATION OF A VACUUM PROCESS

This application is a 371 National Phase of PCT Application No. PCT/EP2017/078051, filed on Nov. 2, 2017; which claims priority to EP Application number 16196985.2 filed on Nov. 3, 2016 and each of which is herein incorporated by reference in its entirety.

The invention relates to a system consisting of a vacuum control valve and a regulating unit for the regulated operation of a processing process under vacuum conditions.

Vacuum valves for regulating a volume or mass flow and for essentially gas-tight closing of a flow path leading through an opening formed in a valve housing are generally known from the prior art in various embodiments and are used in particular for vacuum chamber systems in the area of IC, semiconductor or substrate production, which must take place in a protected atmosphere without the presence of contaminating particles if possible. Such vacuum chamber systems comprise in particular at least one evacuatable vacuum chamber, which is provided for receiving semiconductor elements or substrates to be processed or produced, and which has at least one vacuum chamber opening through which the semiconductor elements or other substrates can be guided into and out of the vacuum chamber, and at least one vacuum pump for evacuating the vacuum chamber. For example, in a production plant for semiconductor wafers or liquid crystal substrates, the highly sensitive semiconductor or liquid crystal elements pass sequentially through several process vacuum chambers in which the parts located within the process vacuum chambers are each processed by means of a processing device. Both during the processing process within the process vacuum chambers and during the transport from chamber to chamber, the highly sensitive semiconductor elements or substrates must always be in a protected atmosphere—especially in an airless environment.

For this purpose, peripheral valves are used to open and close a gas inlet or outlet and transfer valves are used to open and close the transfer openings of the vacuum chambers for inserting and removing the parts.

The vacuum valves through which semiconductor parts pass are referred to as vacuum transfer valves due to the area of application described and the associated dimensioning, as rectangular valves due to their mainly rectangular opening cross-section and also as slide valves, rectangular sliders or transfer slide valves due to their normal mode of operation.

Peripheral valves are used in particular to control or regulate the gas flow between a vacuum chamber and a vacuum pump or another vacuum chamber. For example, peripheral valves are located within a pipe system between a process vacuum chamber or a transfer chamber and a vacuum pump, the atmosphere or another process vacuum chamber. The opening cross-section of such valves, also known as pump valves, is generally smaller than that of a vacuum transfer valve. Peripheral valves are also called regulating valves because, depending on the application, they are used not only to completely open and close an opening but also to control or regulate a flow by continuously adjusting the opening cross-section between a fully open position and a gas-tight closed position. A possible peripheral valve for controlling or regulating the gas flow is the pendulum valve.

In a typical pendulum valve, such as the one known from U.S. Pat. No. 6,089,537 (Olmsted), the first step is to rotate a normally round valve disk, via an opening that is usually also round, from a position that releases the opening to an intermediate position that covers the opening. In the case of a slide valve, as described for example in U.S. Pat. No. 6,416,037 (Geiser) or U.S. Pat. No. 6,056,266 (Blecha), the valve disk, as well as the opening, is usually rectangular and in this first step is pushed linearly from a position releasing the opening into an intermediate position covering the opening. In this intermediate position, the valve disk of the pendulum or slide valve is located at a distance from the valve seat surrounding the opening. In a second step, the distance between the valve disk and the valve seat is reduced so that the valve disk and the valve seat are pressed evenly against each other and the opening is closed essentially gas-tight. This second movement preferably occurs in a direction substantially perpendicular to the valve seat. The sealing can, for example, take place either via a sealing ring arranged on the closing side of the valve disk, which is pressed onto the valve seat surrounding the opening or via a sealing ring on the valve seat, against which the closing side of the valve disk is pressed. Due to the two-step closing process, the sealing ring between the valve disk and the valve seat is subjected to hardly any shear forces that would destroy the sealing ring, as the movement of the valve disk in the second step takes place essentially in a straight line perpendicular to the valve seat.

Various sealing devices are known from the prior art, for example from the U.S. Pat. No. 6,629,682 B2 (Duelli). A suitable material for sealing rings and seals in vacuum valves is, for example, fluororubber, also known as FKM, in particular the fluoroelastomer known under the trade name "Viton", and perfluororubber, FFKM for short.

From the prior art, different actuator systems are known to achieve this combination of a rotational movement of the pendulum valve and a translational movement of the valve disk parallel to the opening and a substantially translational movement perpendicular to the opening, for example from U.S. Pat. No. 6,089,537 (Olmsted) for a pendulum valve and from U.S. Pat. No. 6,416,037 (Geiser) for a slide valve.

The valve disk must be pressed against the valve seat in such a way that both the required gas tightness within the entire pressure range is ensured and damage to the sealing medium, in particular the sealing ring in the form of an O-ring, caused by excessive pressure loading is avoided. In order to guarantee this, well-known valves provide for regulated contact pressure control of the valve disk as a function of the pressure difference between the two valve disk sides. Especially with large pressure fluctuations or the change from vacuum to overpressure, or vice versa, an even force distribution along the entire circumference of the sealing ring cannot always be guaranteed. In general, the aim is to decouple the sealing ring from support forces resulting from the pressure applied to the valve. In U.S. Pat. No. 6,629,682 (Duelli), for example, a vacuum valve with a sealing medium is proposed, which consists of a sealing ring and an adjacent support ring, so that the sealing ring is essentially free of support forces.

In order to achieve the required gas tightness, selectively for both positive and negative pressure, some well-known pendulum valves or slide valves additionally or alternatively to the second movement step provide a valve ring, which can be displaced perpendicularly to the valve disk, surrounds the opening and is pressed onto the valve disk to close the valve gas-tight. Such valves with valve rings that can be actively displaced relative to the valve disk are known, for example, from DE 1 264 191 B1, DE 34 47 008 C2, U.S. Pat. No. 3,145,969 (von Zweck) and DE 77 31 993 U. U.S. Pat. No. 5,577,707 (Brida) describes a pendulum valve with a valve body having an orifice and a valve disk that can be pivoted parallel across the orifice to control flow through the orifice. A valve ring, which surrounds the opening, can be actively moved vertically in the direction of the valve disk by means of several springs and compressed air cylinders. A possible further development of this pendulum valve is proposed in US 2005/0067603 A1 (Lucas et al.).

Since the above-mentioned valves are used, among other things, in the manufacture of highly sensitive semiconductor elements, the particle generation caused in particular by the actuation of the valve and by the mechanical load on the valve closure element and the number of free particles in the valve chamber must be kept as low as possible. Particle generation is primarily a result of friction, for example through metal-to-metal contact and abrasion.

As described above, vacuum regulating valves are used to set a defined process environment in a process chamber. The regulation is typically performed by means of a pressure signal, which provides information about the internal chamber pressure, and by means of a target variable, i.e. a target pressure, which is to be achieved by means of the regulation. The position of a valve closure (valve disk) is then varied within the regulation so that the target pressure is reached within a certain period of time.

In such a regulating process there is the problem that in the case of undesired external influences in the process, the regulation is nevertheless carried out solely on the basis of the current pressure value and thus a disadvantageous external influence is simply "overregulated" and thus not determined. For example, if there is a leak in the process chamber, the regulation can continue to set the target pressure, although the gas mixture in the process chamber no longer corresponds to certain target specifications.

The invention is thus based on the object of providing an improved vacuum valve with regulation, which on the one hand enables a (pressure-) regulated operation of a process chamber and on the other hand provides increased reliability for the required quality of the regulating process.

In particular, it is the object of the invention to provide a check of the running regulation or a processing process on the basis of a valve system.

These objects are solved by the realization of the characteristic features of the independent claims. Features which further develop the invention in an alternative or advantageous way can be found in the dependent claims.

The basic idea of the present invention is to record an executed regulating process and to compare the recorded data with target data for the regulating process. From this, it is possible to deduce statements regarding the course of the process and to deduce any deviations from a defined target regulation. In particular, it can be used to detect abrupt disturbances in a processing process, but also to detect long-term changes in the process conditions (e.g. due to a drift).

The invention relates to a valve system consisting of a vacuum valve for regulating a volume or mass flow and for gas-tight interruption of a flow path or for gas-tight closure of a process volume and a regulating unit. The vacuum valve has a valve seat, which has a valve opening defining an opening axis and a first sealing surface surrounding the valve opening. In addition, the vacuum valve has a valve closure, e.g. valve disk, for essentially gas-tight sealing of the valve opening with a second sealing surface corresponding to the first sealing surface or for setting a current size of the opening.

Furthermore, a drive unit which is coupled to the valve closure and is designed such that the valve closure is used to provide respective valve-opening states which can be influenced by respective states of the valve closure (e.g. of a position or angular position of the closure relative to the valve seat or valve housing), is variable and adjustable in a defined manner and that the valve closure is adjustable from an open position, in which the valve closure at least partially releases the vacuum valve opening, to a closed position, in which the first sealing surface of the valve seat is pressed against the second sealing surface and closes the vacuum valve opening in a substantially gas-tight manner, and back again.

In particular, the closure can be adjusted at least substantially along a geometric longitudinal axis in a longitudinal closing direction, and/or the closure can be adjusted by means of, in particular, a geometric pivot axis extending parallel to the longitudinal axis in a transverse closing direction into an intermediate position, in which the valve closure covers the vacuum valve opening and one closure side of the valve closure is located in a spaced-apart opposite position to the valve seat, and back again (see pendulum valve).

The regulating unit of the valve system is designed to execute a regulating process providing a specific variation or adjustment of the valve opening state by actuating the drive unit based on a currently determined regulating variable for a process parameter and based on a target variable, in particular whereby the regulating variable can be approximated to the target variable by such a change in the state of the valve closure.

In accordance with the invention, the regulating unit has a checking functionality for monitoring the regulating process, wherein the checking functionality is configured in such a way that, when the checking functionality is executed within the framework of the execution of the regulating process, a series of states of the valve closure is detected over at least one period of time of the regulating process and these states are stored as current regulating data (e.g. current regulating curve or current regulating course). The current regulating data are compared with determined target regulating data and process information is generated based on the comparison of the current regulating data with the target regulating data.

The monitoring of the regulating process can therefore take place, for example, on the basis of data over an entire regulating cycle or on the basis of data recorded during a part-time segment of the cycle. For this purpose, monitoring ensures a corresponding comparison of current regulating data with target regulating data, each of which is assigned to a corresponding time period. For example, the comparison can be carried out on the basis of a part of a regulating curve and this part of the curve is checked to see whether it is compatible with a part of a nominal regulating range, in particular whether the part of the curve lies continuously within the limits of the nominal regulating range.

In particular, the process parameter is embodied by pressure information for the process volume, wherein the target variable indicates a target pressure for a specific operating state of the process volume and the currently specific regulating variable is a current pressure in the process volume. The regulating process thus regulates the pressure in the process chamber in such a way that it corresponds as closely as possible to the target pressure. This regulation can also be carried out by specifying a specific regulating time period, i.e. the regulation is carried out in such a way that the desired target pressure is or should be set after a specific time period, starting with a start signal for the regulation, e.g. a signal indicating the start of the inflow of a process gas.

According to an embodiment of the invention, the target variable is a target pressure for a certain operation of the process volume and the currently determined regulating variable indicates a current media inflow into the process volume, in particular wherein the currently determined regulating variable is embodied by a current pressure inlet variable. The pressure inlet variable can, for example, represent a mass flow per time unit or provide information about the open position of an inlet valve.

In general, a target pressure or a target curve for the pressure curve for a specific process gas in the process volume provided for this purpose is specified for carrying out a production step under vacuum or low-pressure conditions. This target pressure or curve is to be mapped within the framework of pressure regulation.

In an embodiment form of the invention, the regulating unit has a learning functionality for generating the target regulating data, wherein the learning functionality is configured in such a way that during its execution for a performance of a number of regulating cycles, in particular corresponding to a target operation for the regulating process, respective target states of the valve closure are detected over at least one time segment each of a respective regulating cycle and the detected target states of the valve closure are stored with reference to respective time segments of the regulating cycle as the target regulating data.

Within the scope of the learning function, individual regulating curves can be recorded for respective regulating cycles and this number of regulating curves can be combined to form a target regulating curve. Summarization can be carried out, for example, by means of equalization calculations or averaging on the basis of the individual curves. The target regulating curve represents the target regulating data.

Alternatively or additionally, a target regulating range can be defined by means of the recorded valve states, e.g. permissible position ranges for the valve position can be defined for respective regulating times. The target regulating range can therefore also represent the target regulating data.

In particular, the invention allows the process information to be generated by comparing the current regulating data with the specific target regulating data in such a way that the process information contains information regarding process integrity for the regulating process.

In particular, an undesirable process state can be identified on the basis of the process information, in particular an undesirable mass inflow during the regulating process, in particular wherein the existence of a leak in the process volume is identifiable.

The regulating data or target regulating data preferably represent the course of the respective (target) regulating process and/or are preferably recorded in the form of a regulating curve.

According to an embodiment of the invention, the process information has an output signal and the output signal is generated acoustically or visually. In particular, the signal may be a warning signal. The process information may also contain quality information indicating a quality for the regulating process, wherein a user output, in particular error information or an alarm signal, can be generated on the basis of this quality information.

In one embodiment, outlet information is stored with the current specific regulating variable or said information is currently determined, wherein the outlet information specifies which mass or which volume of a medium flows out of the process volume per time unit and as a function of the state of the valve closure. In particular, this information, together with the knowledge of an inflow into the volume, can form a suitable actuating variable for a target regulating behavior.

In addition to monitoring the process, the checking functionality can also be configured in such a way that, depending on the process information, the regulating process is automatically adapted by specifically changing the currently determined regulating variable or the target variable, in particular by setting an offset. In other words, the checking functionality allows intervening in the regulating process and, for example, instead of an actually measured pressure value, an adjusted virtual value for the pressure in the process chamber can be supplied to the system. The regulator will then use these artificial pressure values to regulate the valve position and adjust it accordingly.

The state of the valve closure is determined in particular by the position of the valve closure caused by the drive unit. This is preferably a position of the valve closure, e.g. a valve disk, relative to the valve seat or valve housing. This position can be determined, for example, by means of an encoder on the drive unit (e.g. on the motor) or by means of the valve itself.

Alternatively or additionally, a current state of the valve closure can be specified as a current opening cross-section of the valve opening, e.g. depending on the valve closure position.

In particular, the vacuum valve and the regulating unit are of integrated design. Both elements thus are formed as one unit and are realized, for example, within one common housing.

Alternatively, the regulating unit can be structurally separate from the vacuum valve and be in communication connection with the vacuum valve, in particular with a wireless radio connection (WLAN, Bluetooth, etc.) or a wired connection. The regulating unit can, for example, be designed as a separate controller, which receives the regulating variables, target variables and, optionally, feedback with regard to the position of the valve closure and, on the basis of this input data and knowledge of the target regulating, calculates and provides a control output signal for the valve motor, in particular directly to the motor.

In a specific arrangement, the regulating unit can be connected to a pressure sensor and an output signal from the pressure sensor provides the currently determined regulating variable. In particular, the pressure sensor is arranged in such a way that the pressure inside the process chamber can thus be measured, in particular continuously or at a certain update frequency. This pressure information can then be fed into the regulating system as a sensor output signal and further processed there.

The regulating unit can also be connected, for example, to a mass flow meter or a mass flow control unit ("gas flow meter" or "mass flow controller"), wherein an output signal from the mass flow meter or the mass flow control unit provides the currently determined regulating variable. This means that the valve position can also be regulated on the basis of information relating to a gas flowing into a process chamber. The opening cross-section of the valve can thus be adjusted in such a way that a quantity of gas flows out per time unit which is adapted to a gas inflow, in particular corresponds to it.

The invention also relates to a method for checking the regulated operation of a vacuum valve, wherein the vacuum valve is designed to regulate a volume or mass flow and to close a process volume in a gas-tight manner. The vacuum valve has a valve seat, which has a valve opening defining an opening axis and a first sealing surface surrounding the valve opening. Furthermore, a valve closure is provided for substantially gas-tight closing of the valve opening with a second sealing surface corresponding to the first sealing surface. In addition, the valve has a drive unit which is coupled to the valve closure and is designed such that the valve closure can be varied and adjusted in a defined manner in order to provide respective valve-opening states which depend on respective states of the valve closure (38), and is adjustable from an open position in which the valve closure at least partially releases the vacuum valve opening into a closing position in which the first sealing surface of the valve closure is pressed against the second sealing surface and closes the vacuum valve opening substantially gas-tight, and back again.

In particular, the drive unit enables adjustment at least substantially along a geometric longitudinal axis in a longitudinal closing direction, and/or as a result of a mobility of the valve closure substantially along or about a geometric transverse axis in a transverse closing direction in an intermediate position, in which the valve closure covers the vacuum valve opening and a closure side of the valve closure is located in a spaced-apart opposite position to the valve seat, and back again.

Within the scope of the method, a regulating process is carried out by actuating the drive unit based on a currently determined regulating variable for a process parameter and a target variable, in particular by approximating the regulating variable to the target variable by changing the state of the valve closure produced in this manner. This provides a specific variation or setting of the valve opening state.

In accordance with the invention, a series of states of the valve closure is recorded over at least a period of time of the regulating process during the execution of the regulating process and the states are stored as current regulating data (e.g. as a regulating curve). The current regulating data are then compared with (pre-) determined (known) target regulating data and process information is generated based on the comparison of the current regulating data with the target regulating data.

The object of the invention is also a computer program product stored on a machine-readable carrier, in particular in a memory unit of a valve system described above. The computer program product has program code to perform or control at least the following steps of the above method:
 Executing a regulating process,
 Recording of the series of states of the valve closure as current control data,
 Comparing the current regulating data with specific target regulating data and
 Creating the process information.

In particular, the program is executed in an electronic data processing unit, in particular the regulating unit, of a valve system. A regulating process can therefore be checked by executing a corresponding (computer-implemented) algorithm.

The device according to the invention and the method according to the invention are described in more detail below on the basis of concrete embodiment examples schematically depicted in the drawings, wherein further advantages of the invention are also discussed. The figures show in detail.

Figure 1:
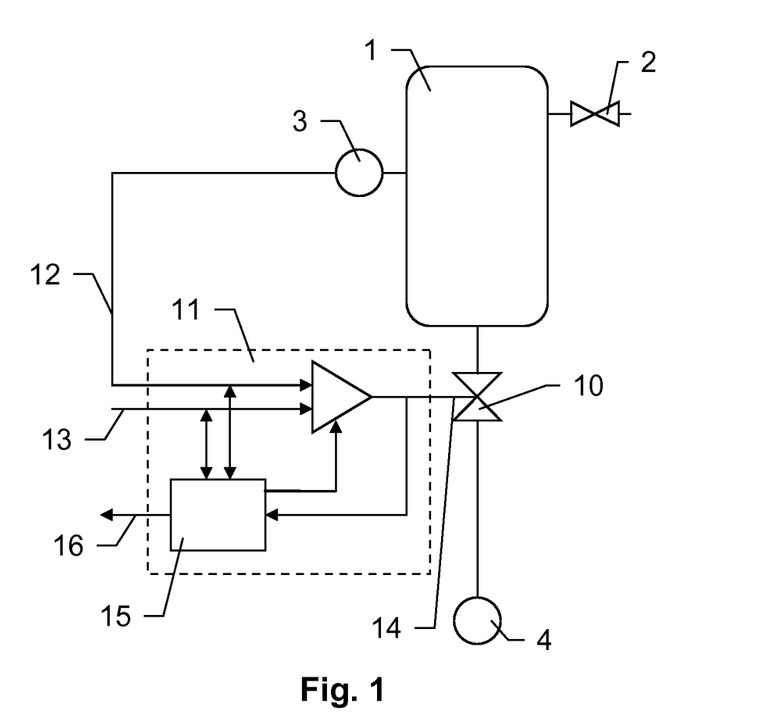
FIG. 1 shows a schematic representation of a first embodiment of a vacuum system according to the invention for the regulated operation of a process chamber.

FIG. 1 schematically shows the structure of a process system for processing an object under vacuum conditions. The structure has a process chamber 1 and a supply line into the process chamber, wherein the supply line is provided with a gas flow meter or regulator 2 and thus a quantity of gas flowing into the process chamber can be measured or the inflowing quantity of gas can be regulated accordingly. A pressure sensor 3 is also provided, which allows the pressure inside the process chamber (chamber pressure) to be determined.

At one outlet side of process chamber 1 a vacuum pump 4 is connected to chamber 1 for its evacuation. Between vacuum pump 4 and chamber 1 there is an adjustable vacuum valve 10 for the control or regulation of the outflowing mass flow. The (controlled) divisibility can be realized e.g. by means of a motorized, pneumatic or hydraulic drive of the valve.

According to the invention, the system has a regulating unit 11, which is connected to the valve 10 and provides a controlled control of the valve 10 on the basis of a corresponding input variable 12 and a target variable 13.

In the illustrated embodiment, a current pressure signal 12 of the pressure sensor 3 is continuously received as input variable 12, i.e. as the currently determined regulating variable, so that a current pressure state is known or provided in process chamber 1. In addition, the regulating unit 11 is provided with a target pressure or a target pressure curve for a particular processing process as a target or setpoint variable 13. Based on these input variables, a control signal 14 is generated with regulating unit 11 and output to the motorized valve 10.

In order to set a desired internal pressure in process chamber 1, the valve opening of vacuum valve 10 is varied during a regulating cycle in such a way that gas is discharged from the process chamber in such a way that the current internal pressure can be approximated to a target pressure. For example, in a first time segment of a processing process the valve opening is set relatively wide open, so that the internal pressure is lowered as quickly as possible and in the further course of the regulation the valve opening is set less wide open, so that in a later time segment the desired internal pressure can be set and maintained by a controlled outflow of a smaller quantity of gas per time unit, wherein in particular a laminar or molecular gas flow or a mixed form of both is present.

By varying the valve position, i.e. the position of the valve closure relative to the valve opening, a regulating course, in particular a regulating curve, is defined for each regulating cycle, i.e. valve positions at respective times in a certain time interval. A processing process in a process chamber is typically repeated many times in regulating cycles, wherein the pressure regulation is then to be carried out in the same way in each case.

According to the invention, the regulating unit has a checking or monitoring functionality 15 for verifying process integrity and/or quality. This functionality defines a target regulation that prescribes how a regulating cycle is to be performed. The target regulation can, for example, be stored in the form of a target regulating curve.

On the basis of the information about a target course of the regulation, a currently recorded regulating course can now be compared with the target course and, based on this comparison, information can be derived as to whether the regulation has been carried out within set limits, e.g. within a tolerance range, or not.

The regulating unit 11 can also have a learning function, which can be used to create the information relating to target regulation. A production cycle is carried out several times with set target conditions (e.g. target pressure, target temperature, pressure curve, temperature curve, etc.) and the pressure in chamber 1 is adjusted with the regulating unit 11 via the valve position to achieve the target pressure. While passing through these production cycles, the valve positions in the individual cycles are stored over the regulating time. The target regulating information combining the individual data records (one data record per regulating cycle) is then derived from the data set that can be generated in this way, for example, by means of clearing calculation or modeling.

The checking functionality 15 can also be designed to adapt the target variable to be achieved as a function of a recorded current regulating process in order, for example, to influence the regulating process in such a way that a detected deviation in the regulation is compensated for in subsequent regulating cycles. In other words, the checking functionality can output the target variable, in particular in a time-dependent modified manner, and introduce it into the regulating circuit in this form.

In a similar way, the checking functionality 15 can have a corresponding effect on the currently measured regulating variable (e.g. measured pressure). For example, the presence of a greater pressure than actually measured can be simulated to cause a faster reduction of the internal pressure.

An intervention in the regulating process by means of the checking functionality 15 can be carried out in particular by means of direct inputs into the regulator, e.g. by adjusting regulating parameters.

The checking module 15 also has an output channel 16, which can be used to output a signal that contains information about the current regulating status. For example, a user can see whether the process is running within its specified limits or whether there are deviations from them. Alternatively or in addition, the signal of a computing unit or superordinate process control can be provided, whereby automatic adjustments of an overall process can be made, for example.

The checking functionality according to the invention thus not only makes it possible to check whether a regulating process intended for the valve 10 is adhered to but also to make a statement as to whether the processing process itself runs within its defined boundary conditions. If, for example, a deviation is found between a currently recorded regulating curve and the target regulating curve stored for the process, this deviation can be used, for example, to determine whether there is a leak in the process chamber or a supply line to the process chamber, and the process can be flagged as faulty. Without the checking functionality according to the invention, such a leak would simply be "overregulated", i.e. the valve would be actuated in such a way that the target pressure is reached within a specified time without any external defect being detected during the process.

Figure 2:
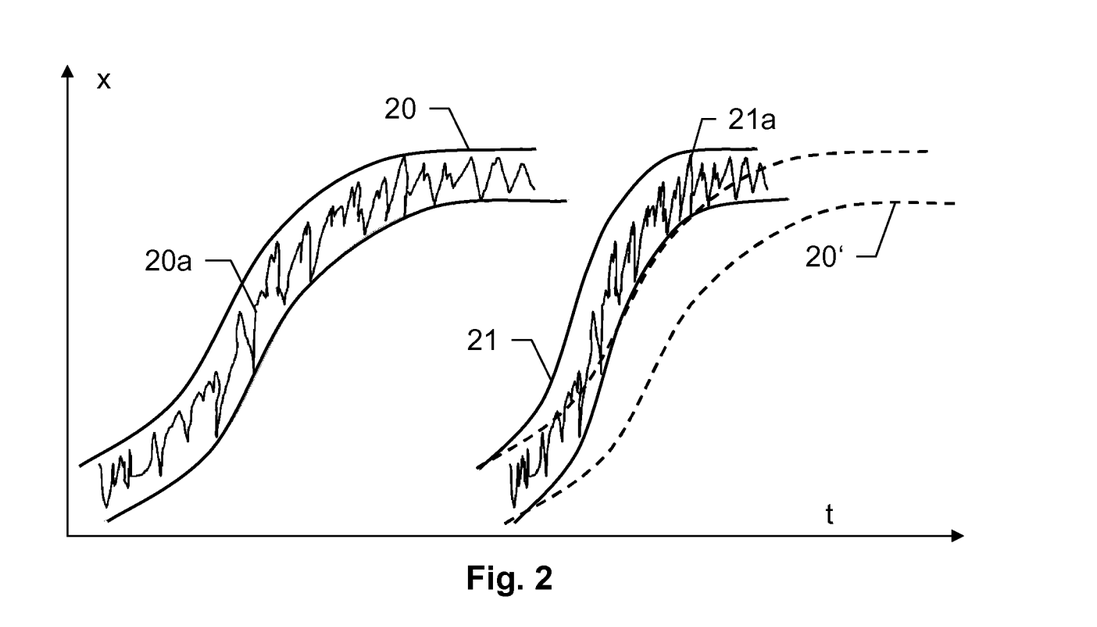
FIG. 2 shows a comparison of a currently recorded regulating curve with a target regulating curve according to the invention.

FIG. 2 shows a target regulating range 20 defined for a regulating cycle and a current regulation 21a recorded for this regulating process.

Within the target regulating range 20, a regulating curve 20a is shown as an example, which was derived from a number of individually recorded regulating curves within the framework of learning processes for a processing step to be performed. Based on the course of this curve 20a, an envelope is generated for curve 20a, which in turn defines a tolerance range 20 for a desired regulation. The recorded regulating curves from the learning process and the illustrated derived curve 20a represent valve positions (x,y) or (angular) positions (°) set by the drive unit (motor, pneumatics, hydraulics, etc.) over the time (t) of a regulating cycle.

The regulation shown by curve 21a represents a current production regulating cycle executed independently of the learning process. The envelope 21 also shown here for this curve 21a shows the given deviation of the regulating process carried out. Curve 21a does not lie within the permissible regulating range described here as 20', which corresponds to the nominal regulating range 20 over the course and is shifted along the time axis for visual inspection of curve 21a, i.e. represents the target regulating range 20.

By comparing the course of the ranges 20/20' and 21 and the curves 20a and 21a, it can be determined that the valve closure is adjusted significantly faster in the current regulating process, i.e. that the closure position changes more quickly over time than provided for in the target regulation. Such a deviation in the course can be an indication of a lower pressure increase in the process volume than expected, which can occur, for example, due to a malfunction of the gas flow regulator.

Alternatively, a deviation from the course can be an indication of the presence of a gas leak if, for example, a larger quantity of gas has to be extracted from the process volume in a shorter time, e.g. with the valve open for a longer period of time. Such a case is typically associated with a slower increase in the regulating curve.

The limits for the permissible target regulating range 20 can be determined as described above by means of a reference curve (e.g. 20a) for the sequence of a target regulation, e.g. by setting a range enveloping the curve. The range can have a certain tolerance in relation to the curve, i.e. the range can have a certain distance from the respective local or global maxima or minima of the curve.

Alternatively, the target regulating range 20 can be determined, for example, by modeling or simulating a regulating process, wherein, for example, an expected gas inflow, a pressure change based on this and the gas outflow to be provided for this purpose are simulated or calculated. In a simpler case, the target regulating curve for the valve can be determined directly with knowledge of the inflowing gas quantity (as a function of time) and in particular of the system structure.

Figure 3A:
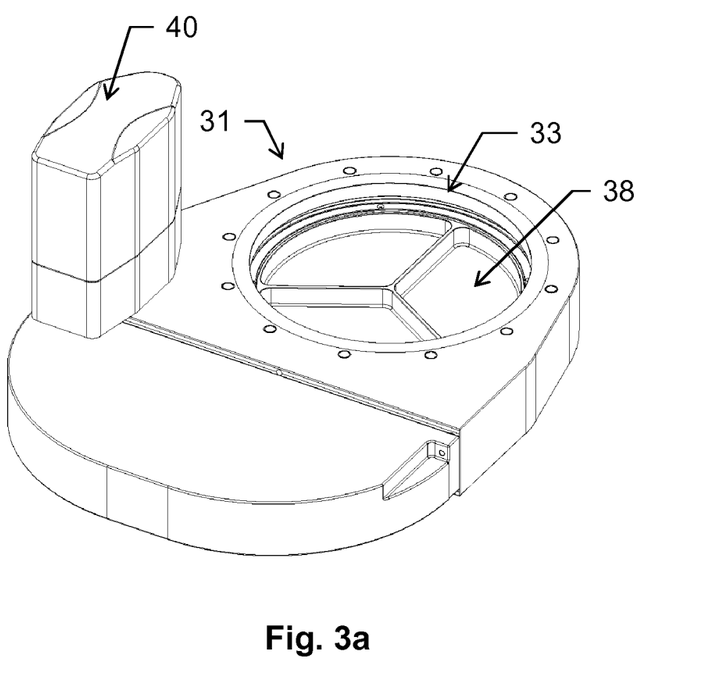
FIGS. 3*a-c* show an embodiment of a regulating valve as a pendulum valve.
Figure 3B:
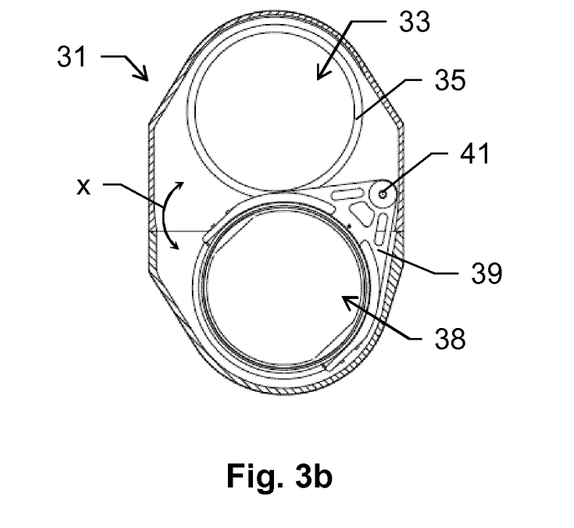
Figure 3C:
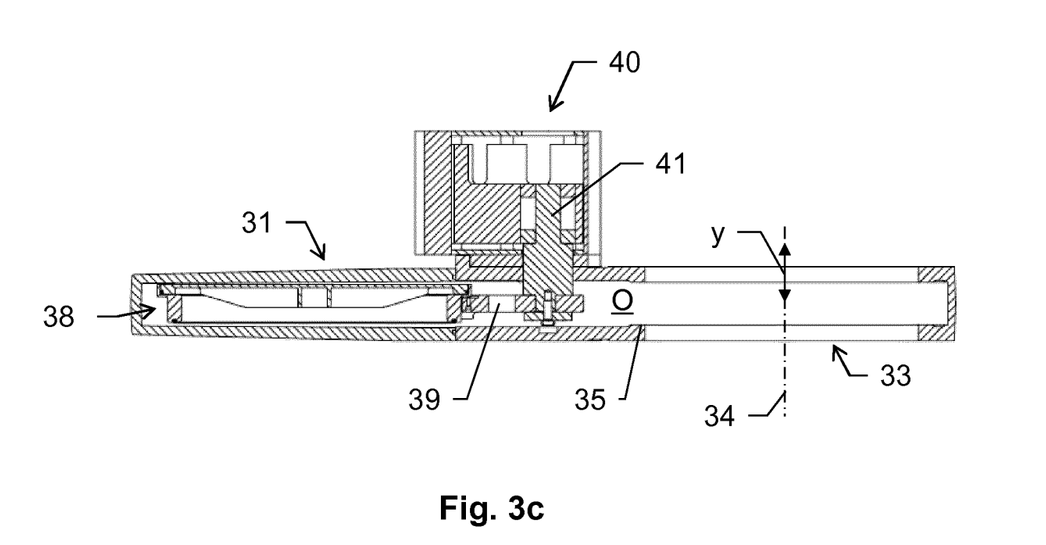

FIGS. 3a to 3c show a possible embodiment of the valve according to the invention in the form of a pendulum valve. The valve for the essentially gas-tight interruption of a flow path has a valve housing 31, which has an opening 33. The opening has a circular cross-section. In a closed position of the valve disk 38, the opening 33 is closed gas-tight by means of the valve disk 38. An open position O of the valve disk 38 is illustrated in FIGS. 3b and 3c.

The opening 33 is enclosed by a valve seat. This valve seat is formed by a sealing surface 35 which faces axially in the direction of the valve disk 38, runs transversely to the opening axis 34, has the shape of a circular ring and is formed in the valve housing 31.

In addition, the valve has a pivoting valve disk 38 which can be adjusted essentially parallel to the opening axis 34.

The valve disk 38 is connected to an electric drive 40 (motor) via an arm 39 arranged on the side of the disc and extending perpendicularly to the opening axis 34. In the closed position of the valve disk 38, this arm 39 is located outside the opening cross-section of opening 33 geometrically projected along the opening axis 34.

An electric drive 40 is designed by using a corresponding gear in such a way that the valve disk 38—as is usual with a pendulum valve—can be pivoted by means of a transverse movement x of the drive 40 transversely to the opening axis 34 and substantially parallel over the cross-section of the opening 33 and perpendicular to the opening axis 34 in form of a pivot movement about a pivot axis 41 between an open position O and an intermediate position and can be displaced linearly by means of a longitudinal movement y of the drive 40 taking place parallel to the opening axis 34. In the open position O, the valve disk 38 is positioned in a dwell section located laterally adjacent to the first opening 33 so that the opening 33 and the flow path are released. In the intermediate position, the valve disk 38 is positioned at a distance above the first opening 33 and covers the opening cross-section of opening 33. In the closed position, opening 33 is closed gas-tight and the flow path is interrupted in that a gas-tight contact exists between the valve closure 38 (valve disk) and the sealing surface 35 of the valve seat.

In order to enable automated and regulated opening and closing of the valve, the valve is provided with an electronic regulation system which is designed and connected to the drive 40 in such a way that the valve disk 38 can be adjusted accordingly for gas-tight closing of a process volume or for regulating an internal pressure of this volume. Such a regulating unit together with the valve forms a valve system according to the invention.

The position of the valve disk 38 is variably adjusted on the basis of the regulating variables and an output control signal. The input signal is information about the current pressure status in a process volume connected to the valve. In addition, the regulator can be provided with a further input variable, e.g. a mass flow into the volume. On the basis of these variables and on the basis of a specified target pressure that is to be set or reached for the volume, the valve is then set in a regulated manner over the time of a regulating cycle, so that a mass outflow from the volume can be regulated over time by means of the valve. For this purpose, a vacuum pump is provided behind the valve, i.e. the valve is arranged between the process chamber and the pump. Thus a target pressure curve can be adjusted.

By setting the valve closure 38, a respective opening cross-section is set for the valve opening 33 and thus the possible amount of gas that can be evacuated from the process volume per time unit is set. For this purpose, the valve closure 38 may have a shape deviating from a circular shape, particularly in order to achieve a media flow that is as laminar as possible.

To regulate the opening cross section, the valve disk 38 can be adjusted from the open position O to the intermediate position by the regulating unit using the transverse movement x of the drive 40 and from the intermediate position to the closed position using the longitudinal movement y of the drive 40. To fully open the flow path, the valve disk 38 can be moved by the controller from the closed position to the intermediate position by means of the longitudinal movement y of the drive 40 and from there from the intermediate position to the open position O by means of the transverse movement x of the drive 40.

In this embodiment example, the drive 40 is designed as an electric motor, wherein the gear can be switched in such a way that driving the drive 40 causes either the transverse movement x or the longitudinal movement y. The drive 40 and the gear are electronically controlled by the regulator. Such gears, in particular with gate-type gear shifts, are known from the prior art. Furthermore, it is possible to use several drives to effect the transverse movement x and the longitudinal movement y, wherein the controller assumes the control of the drives.

The precise regulation of the flow with the pendulum valve described above is not only possible as a result of the pivoting adjustment of the valve disk 38 between the open position O and the intermediate position by means of the transverse movement x, but above all by linear adjustment of the valve disk 38 along the opening axis 34 between the intermediate position, the closed position by means of the longitudinal movement y. The pendulum valve described can be used for precise regulating tasks.

Both the valve disk 38 and the valve seat each have a sealing surface 35—a first and a second sealing surface. The first sealing surface 35 also has a seal. This seal can, for example, be vulcanized onto the valve seat as a polymer by means of vulcanization. Alternatively, the seal can be designed as an O-ring in a groove of the valve seat, for example. A sealing material can also be bonded to the valve seat and thus embody the seal. In an alternative embodiment, the seal can be arranged on the side of the valve disk 38, especially on the second sealing surface. Combinations of these designs are also conceivable.

As an alternative to a pendulum valve as shown, the vacuum valve system according to the invention can be realized with another type of vacuum valve, e.g. a flap valve, slide valve or a so-called butterfly regulating valve. In particular, the system is designed with pressure regulating valves for use in the vacuum area. In addition, pendulum valves can also be used, the closure of which can only be adjusted in one direction.

It is understood that the figures shown only schematically represent possible embodiment examples. The different approaches can be combined with each other as well as with processes and devices for pressure control for vacuum processes according to the prior art.

The invention claimed is:

1. A valve system comprising a vacuum valve for regulating a volume or mass flow and for the gas-tight closure of a process volume and of a regulating unit, the vacuum valve comprising:

a valve seat having a valve opening defining an opening axis and a first sealing surface surrounding the valve opening, a valve closure for substantially gas-tight closing of the valve opening with a second sealing surface corresponding to the first sealing surface, and a drive unit coupled to the valve closure and configured such that the valve closure can be varied and adjusted in a defined manner for providing respective valve opening states which depend on respective states of the valve closure, and is adjustable from an open position (O), in which the valve closure at least partially releases the valve opening, to a closed position, in which the first sealing surface is pressed against the second sealing surface and closes the valve opening substantially gas-tight, and back again, forming the vacuum valve, and wherein the regulating unit is designed to carry out a regulating process which provides a specific variation or setting of the valve opening state by actuating the drive unit based on a currently determined regulating variable for a process parameter and a target variable, as a result of which the regulating variable can be approximated to the target variable, wherein the regulating unit has a checking functionality for monitoring the regulating process, which checking functionality is configured such that when the checking functionality is carried out a series of states of the valve closure is detected over at least a time segment of the regulating process in the course of the execution of the regulating process and this series is stored as current regulating data, the current regulating data are compared with determined target regulating data, and process information is generated based on the comparison of the current control data with the target regulating data, and wherein the regulating unit has a learning functionality for generating the target regulating data, wherein the learning functionality is configured such that, when carried out, respective target states of the valve closure are detected over at least one time segment each of a respective regulating cycle for performing a number of regulating cycles corresponding to a target operation for the regulating process, and the detected target states of the valve closure are stored with reference to respective time segments of the regulating cycle as the target regulating data.

2. The valve system according to claim 1, wherein the process parameter is embodied by pressure information for the process volume, the target variable is a target pressure for a specific operation of the process volume, and the currently determined regulating variable represents a current pressure in the process volume.

3. The valve system according to claim 1, wherein the target variable is a target pressure for a specific operation of the process volume, and the currently determined regulating variable indicates a current media inflow into the process volume, wherein the currently determined regulating variable is embodied by a current pressure inlet variable.

4. The valve system according to claim 1, wherein the process information is generated by the comparison of the current regulating data with the determined target regulating data in such a way that the process information has information relating to process integrity for the regulating process, wherein an undesirable process state can be identified on the basis of the process information, the undesirable process state being an undesirable mass inflow during the regulating process, wherein an existence of a leak in the process volume can be identified.

5. The valve system according to claim 1, wherein the current regulating data and/or the target regulating data represent the current course or a target course of the regulating process, and/or are recorded in the form of a respective regulating curve.

6. The valve system according to claim 1, wherein the process information comprises an output signal and the output signal is generated acoustically or visually, and/or has quality information indicating a quality for the regulating process and a user output, error information or an alarm signal, can be generated on the basis of this quality information.

7. The valve system according to claim 1, wherein with the currently determined regulating variable an outlet information is stored or is currently determined, wherein the outlet information indicates which mass or which volume of a medium flows out of the process volume per unit of time and as a function of the state of the valve closure.

8. The valve system according to claim 1, wherein the checking functionality is configured in such a way that, depending on the process information, the regulating process is automatically adapted by selectively changing the currently determined regulating variable or the target variable, by setting an offset.

9. The valve system according to claim 1, wherein the state of the valve closure indicates a position of the valve closure effected by the drive unit relative to the valve seat, and/or indicates a current opening cross-section of the valve opening as a function of the valve closing position.

10. The valve system according to claim 1, wherein the vacuum valve and the regulating unit are of integrated design.

11. The valve system according to claim 1, the regulating unit is formed structurally separate from the vacuum valve and is in communication connection with the vacuum valve, wherein a wireless radio connection or a wired connection is provided.

12. The valve system according to claim 1, the regulating unit is connected to a pressure sensor and an output signal of the pressure sensor provides the currently determined regulating variable, and/or to a mass flow meter or a mass flow control unit and an output signal of the mass flow meter or the mass flow control unit provides the currently determined regulating variable.

13. The valve system according to claim 1, further comprising a computer program product which is stored on a machine-readable medium, in a memory unit of the valve system, wherein the computer program product comprises program code for carrying out or controlling at least a regulating process, configured to record the series of states of the valve closure, to compare the current regulating data with the target regulating data, and to generate the process information, and wherein the program code is executed in an electronic data processing unit of the valve system.

14. A method for checking a regulated operation of a vacuum valve, wherein the vacuum valve is designed to regulate a volume or mass flow and to close a process volume in a gas-tight manner and comprises:

a valve seat having a valve opening defining an opening axis and a first sealing surface surrounding the valve opening, a valve closure for substantially gas-tight sealing the valve opening with a second sealing surface corresponding to the first sealing surface, and a drive unit coupled to the valve closure and configured such that the valve closure can be varied and adjusted in a defined manner for providing respective valve opening states which depend on respective states of the valve closure, and is adjustable from an open position (O), in which the valve closure at least partially opens the valve opening, to a closed position, in which the first sealing surface is pressed against the second sealing surface and closes the valve opening substantially gas-tight, and back again, forming the vacuum valve, and wherein a regulating process is carried out by actuating the drive unit based on a currently determined regulating variable for a process parameter and a target variable, wherein a specific variation or setting of the valve opening state is provided, as a result of which the regulating variable is approximated to the target variable, wherein a series of states of the valve closure is detected over at least a time segment of the regulating process in the course of the execution of the regulating process and this series is stored as current regulating data, the current regulating data are compared with determined target regulating data, and process information is generated based on the comparison of the current regulating data with the determined target regulating data, and wherein respective target states of the valve closure are detected over at least one time segment each of a respective regulating cycle for performing a number of regulating cycles corresponding to a target operation for the regulating process, and the detected target states of the valve closure are stored with reference to respective time segments of the regulating cycle as the target regulating data.

* * * * *